United States Patent
Kaushik et al.

(10) Patent No.: US 8,233,931 B2
(45) Date of Patent: Jul. 31, 2012

(54) INITIATING A SELECTIVE DYNAMIC GROUP CALL FROM A WIRELESS MOBILE APPLICATION

(75) Inventors: Nilam Kaushik, Waterloo (CA); Larry Kuhl, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1031 days.

(21) Appl. No.: 12/185,255

(22) Filed: Aug. 4, 2008

(65) Prior Publication Data

US 2010/0029316 A1  Feb. 4, 2010

(51) Int. Cl.
H04B 7/00 (2006.01)
H04W 4/00 (2009.01)
H04W 40/00 (2009.01)

(52) U.S. Cl. ........ 455/519; 455/517; 455/518; 455/466; 455/428

(58) Field of Classification Search ........... 455/517, 455/518, 519, 466, 428
See application file for complete search history.

(56) References Cited

U.S. PATENT DOCUMENTS

| | | | | |
|---|---|---|---|---|
| 6,516,200 | B1 * | 2/2003 | Schmidt et al. | 455/518 |
| 7,558,590 | B2 * | 7/2009 | Baudino et al. | 455/518 |
| 7,818,020 | B1 * | 10/2010 | Manroa et al. | 455/519 |
| 7,844,294 | B1 * | 11/2010 | Manroa et al. | 455/519 |
| 7,864,716 | B1 * | 1/2011 | Manroa et al. | 370/260 |
| 2003/0050083 | A1 * | 3/2003 | Metais et al. | 455/509 |
| 2006/0030348 | A1 * | 2/2006 | Drozt et al. | 455/519 |
| 2006/0046761 | A1 * | 3/2006 | Bishop et al. | 455/519 |
| 2006/0058012 | A1 * | 3/2006 | Caspi et al. | 455/415 |
| 2006/0063552 | A1 * | 3/2006 | Tillet et al. | 455/519 |
| 2006/0234676 | A1 * | 10/2006 | Harris et al. | 455/410 |
| 2007/0105569 | A1 * | 5/2007 | Brass et al. | 455/466 |
| 2007/0123285 | A1 * | 5/2007 | Baudino et al. | 455/518 |
| 2007/0145110 | A1 * | 6/2007 | Kelley et al. | 235/375 |
| 2007/0281674 | A1 * | 12/2007 | Mock et al. | 455/417 |
| 2008/0104572 | A1 * | 5/2008 | Hernandez et al. | 717/114 |
| 2008/0125183 | A1 * | 5/2008 | Burgan et al. | 455/567 |
| 2008/0132210 | A1 * | 6/2008 | Korneluk et al. | 455/414.1 |
| 2008/0155567 | A1 * | 6/2008 | O'Shaughnessy et al. | 719/321 |
| 2009/0080365 | A1 * | 3/2009 | Song et al. | 370/312 |
| 2009/0203331 | A1 * | 8/2009 | Ranalli et al. | 455/90.2 |

OTHER PUBLICATIONS

OMa-RD-3rd Generation Partnership Project Mobile competence Centre, see pp. 26, line 4—p. 30 line 33 May 6, 2004.
3GPP 3rd Generation Partership Project; Technical Specification Group Servioces and Systems Aspects, Telecommunications management p. 105 line 1—p. 108 line 28. Jan. 16, 2007.

* cited by examiner

*Primary Examiner* — Bobbak Safaipour
(74) *Attorney, Agent, or Firm* — Gowling Lafleur Henderson LLP

(57) ABSTRACT

A method and a wireless mobile device for initiating selective dynamic group (SDG) calls in an application on a push-to-talk (PTT) capable wireless network using a concatenated sequence of PTT mobile numbers. The PTT mobile numbers are separated by PTT call identifiers in a concatenated sequence. The PTT mobile numbers are validated and a PTT SDG call sequence is generated using the plurality of validated PTT mobile numbers when a call initiator input is received. The PTT SDG call is then initiated on the wireless network to the PTT mobile numbers in the sequence.

18 Claims, 4 Drawing Sheets

INITIATING A SELECTIVE DYNAMIC GROUP CALL FROM A WIRELESS MOBILE APPLICATION

TECHNICAL FIELD

The present invention relates to push-to-talk feature of wireless mobile devices and in particular to initiating selective dynamic group calls.

BACKGROUND

A Push-to-Talk (PTT) wireless mobile device is a mobile device capable of participating in a group conversation in which only one speaker can talk at a time and each member of the group can hear the speaker. The wireless mobile device works by having a user push a button to transmit and release the button to receive signals transmitted by other user(s). The walk-talkie like nature of PTT enables immediate communication between a group of people anywhere within network coverage. A PTT group conversation is initiated by a selective dynamic group (SDG) call by one member of the group. An SDG call group defines all the members of the PTT group and is stored as an address book entry in a wireless mobile application. The SDG call group must be preconfigured by the user with each of the participants' PTT numbers to initiate a call, limiting the ability to create ad-hoc SDG groups.

Therefore there is a need for an improved method for initiating selective dynamic group calls from a wireless mobile application.

BRIEF DESCRIPTION OF THE DRAWINGS

It will be noted that throughout the appended drawings, like features are identified by like reference numerals.

DETAILED DESCRIPTION

Embodiments are described below, by way of example only, with reference to FIGS. 1-4.

In accordance with the present disclosure there is provided a method of initiating a selective dynamic group (SDG) call from an application on a push-to-talk (PTT) capable wireless mobile device on a wireless network, the method comprising: receiving an input entered to the application on the wireless mobile device; determining if one or more PTT call identifiers are present in the input, each PTT call identifier separating unique PTT mobile numbers; validating PTT mobile numbers designated by PTT identifiers; generating a PTT SDG call sequence using the validated PTT mobile numbers; and initiating the PTT SDG call on the wireless network to the PTT mobile numbers in the sequence.

In accordance with the present disclosure there is also provided a wireless mobile device capable of initiating push-to-talk (PTT) selective dynamic group (SDG) calls on a PTT capable wireless network, the wireless mobile device comprising: a transmitter for initiating SDG calls; a receiver for receiving SDG calls; a control processor for executing SDG calls using the transmitter and receiver by executing an application for performing: receiving an input entered to an application on the wireless mobile device; determining if one or more PTT identifiers are present in the input sequence, each PTT call identifier separating unique PTT mobile numbers; validating PTT mobile numbers designated by PTT identifiers when a call initiator input is received from the user; generating a PTT SDG call sequence using the validated PTT mobile numbers; and initiating the PTT SDG call on the wireless network to the PTT mobile numbers in the sequence.

Figure 1:
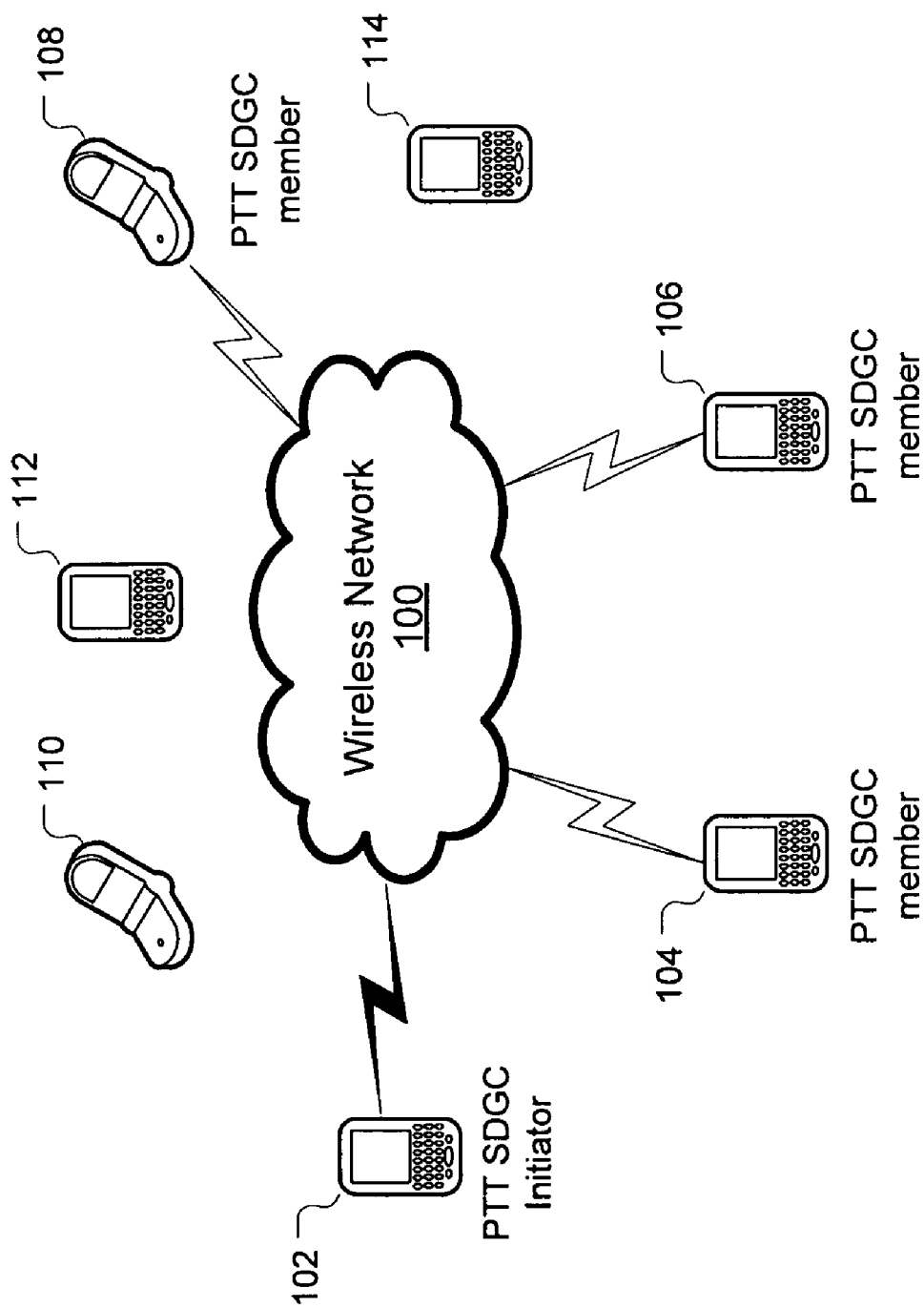
FIG. 1 is a schematic representation of a PTT group call.

Referring to the drawings, FIG. 1 is a schematic representation of a PTT group call. A plurality of PTT capable wireless mobile devices access a wireless network 100. The wireless network may be based upon technologies such as the Motorola™ iDEN™, Push-to-Talk over Cellular (PoC) from the Open Mobile Alliance (OMA) based on the IP Multimedia Subsystem (IMS) and GPRS, EDGE or WCDMA and Qualcomm™ QChat™ using EV-DO based networks, to name a few. Wireless mobile device 102 initiates an SDG call based upon a PTT number sequence separated by identifiers. The wireless mobile network 100 processes the PTT numbers to initiate the SDG call. The SDG call is similar to a private call, but is made to all members of an SDG list at once. The SDG list must contain at least 2 members and can contain up to 20 members, the SDG list is then stored as a contact in an Address Book in the mobile wireless device so it can be accessed at any time. The requirement to individually select numbers to create an SDG group for each call limits the user ability to initiate on-the-fly SDG calls where groups are not pre-defined.

In the iDEN network, the PTT numbers (also called UFMI—urban fleet member id) may be defined as Urban Id*Fleet Id*Member Id. So for example, in 123*345*4545, 123 is the Urban (or Area) Identifier, 345 is the Fleet (or Network) Identifier and 4545 is the Member Identifier. In this example there can be up to 21 digits (including the *'s (star key) to distinguish the entries) in a PTT number. Wireless mobile devices present in the same Urban Id and Fleet Id as the initiating wireless mobile device can be identified by only the member identifier Alternatively, the wireless mobile device may be identified by the associated telephone number such as for example in PoC networks. A similar SDG identifier would be used to distinguish PTT numbers.

Once mobile device 102 has initiated the SDG call, the identified mobiles, 104, 106 and 108 are notified by the network and a call is established. The users of each device can then talk by pushing the PTT button on the associated phone. Only members of the SDG group can participate and hear the conversation within the group.

Figure 2:
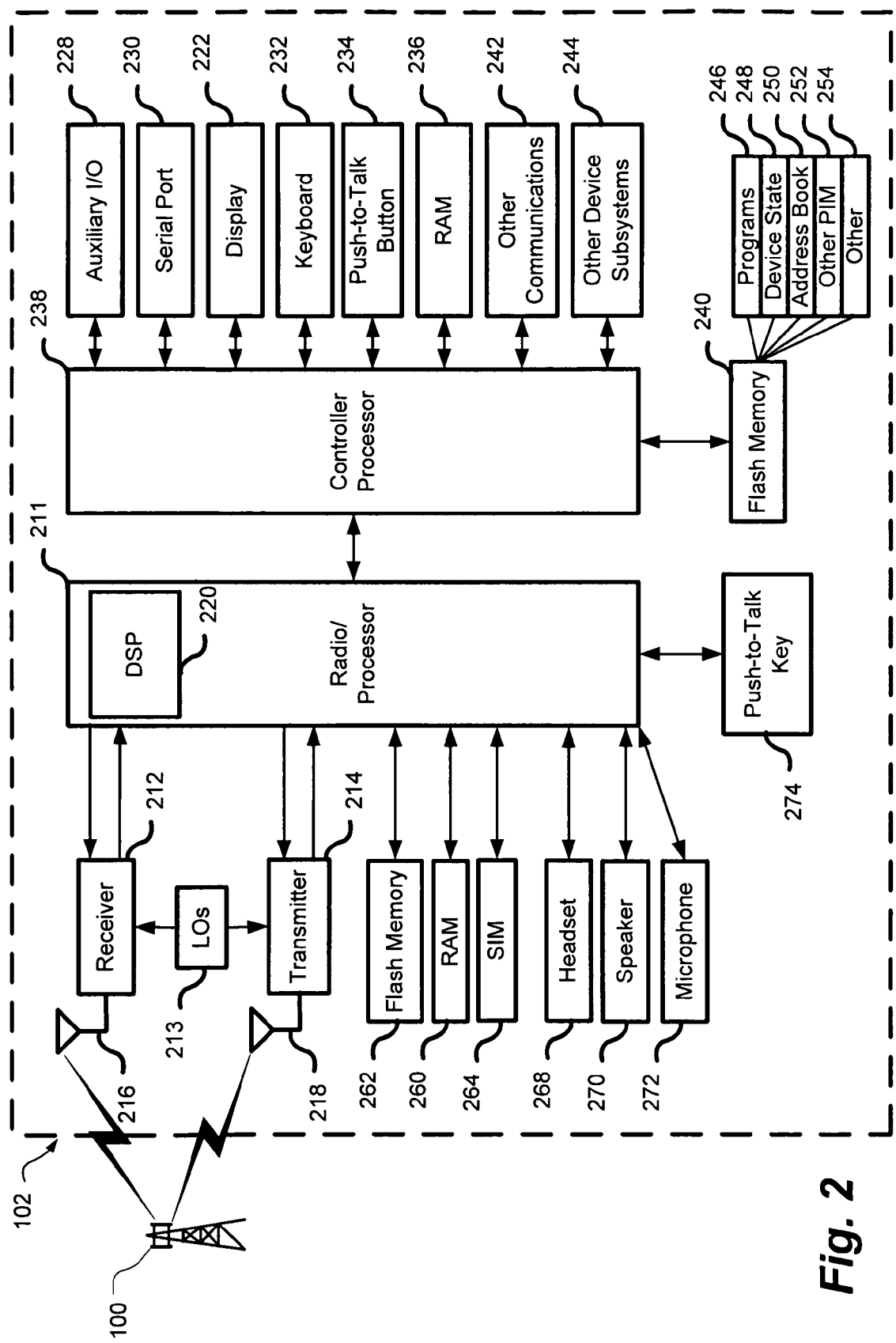
FIG. 2 is a block diagram representation of a PTT wireless mobile device.

FIG. 2 is a block diagram of a wireless mobile device 102 incorporating a communication subsystem having both a receiver 212 and a transmitter 214, as well as associated components such as one or more embedded or internal antenna elements 216 and 218, local oscillators (LOs) 213, and a processing module such as a digital signal processor (DSP) 220. The particular design of the communication subsystem will be dependent upon the communication network in which the device is intended to operate such as iDEN, CDMA, EV-DO, UTMS, HSPDA, GSM, EDGE, GPRS, and 3GPP LTE networks.

When required network registration or activation procedures have been completed, wireless mobile device 102 may send and receive communication signals over the network 100. Signals received by antenna 216 through communication network 100 are input to receiver 212, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 220.

In a similar manner, signals to be transmitted are processed, including modulation and encoding for example, by DSP 220 and input to transmitter 214 for digital to analog conversion, frequency up conversion, filtering, amplification and transmission over the communication network 100 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Wireless device 102 preferably includes a radio processor 211 and a control processor 238 which together control the overall operation of the device. DSP 220 is located on radio processor 211. Communication functions are performed through radio processor 211.

Radio processor 211 interacts with receiver 212 and transmitter 214, and further with flash memory 262, random access memory (RAM) 260, the subscriber identity module 264, a headset 268, a speaker 270, a microphone 272 and a push-to talk key 274.

Microprocessor 238 interacts with further device subsystems such as the display 222, flash memory 240, random access memory (RAM) 236, auxiliary input/output (I/O) subsystems 228, serial port 230, keyboard 232, push to talk button 234, other communications 242 and other device subsystems generally designated as 244.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Software used by radio processor 211 and microprocessor 238 is preferably stored in a persistent store such as flash memory 240 and 262, which may instead be a read-only memory (ROM) or similar storage element (not shown). Those skilled in the art will appreciate that the operating system, specific device applications, or parts thereof, may be temporarily loaded into a volatile memory such as RAM 236 and RAM 260. Received communication signals may also be stored in RAM 236.

As shown, flash memory 240 can be segregated into different areas for computer programs 246, device state 248, address book 250, other personal information management (PIM) 252 and other functionality generally designated as 254 such as dedicated telephone or PTT initiation applications. These different storage types indicate that each program can allocate a portion of flash memory 240 for their own data storage requirements. Microprocessor 238, in addition to its operating system functions, preferably enables execution of software applications on the mobile station.

For voice communications, overall operation of wireless mobile device 102 is similar, except that received signals would preferably be output to the speaker 270 or headset 268 and signals for transmission would be generated by the microphone 272. Alternative voice or audio I/O subsystems, such as a voice message recording subsystem, may also be implemented on mobile station 100.

Serial port 230 in FIG. 2 would normally be implemented in a personal digital assistant (PDA)-type wireless mobile device for which synchronization with a user's desktop computer (not shown) may be desirable, but is an optional device component. Such a port 230 would enable a user to set preferences through an external device or software application and would extend the capabilities of wireless mobile device 102 by providing for information or software downloads to wireless mobile device 102 other than through a wireless communication network. The alternate download path may for example be used to load an encryption key onto the device through a direct and thus reliable and trusted connection to thereby enable secure device communication.

Other device subsystems 244, such as a short-range communications subsystem, is a further optional component which may provide for communication between wireless mobile device 102 and different systems or devices, which need not necessarily be similar devices. For example, the subsystem 244 may include an infrared device and associated circuits and components or a Bluetooth™ communication module to provide for communication with similarly enabled systems and devices.

In a dual processor wireless device with a push-to-talk capability, microprocessor 238 is typically used for controlling the push-to-talk button 234, and the other processor 211 has a radio frequency interface and a radio push-to-talk key 274 for originating or participating in a PTT SDG call.

To enable on-the-fly configuration of SDG calls, multiple PTT mobile numbers can be entered by a user of the wireless mobile device through a program 246 such as a telephone dialing application or a dedicated PTT dialing application. The concatenated PTT numbers, or contact names, are separated by a unique identifier to delineate between numbers and to identify that a PTT call is to be initiated rather than a private voice call. If the user knows the participants' mobile PTT numbers, such as for example in an iDEN based network, they can enter a number sequence comprising each of the mobile devices that they wish to be on the call. For example, the string "123#34*45*45#456" would be entered, where the # (pound) sign is used to identify that it is an SDG call and designate the next PTT mobile number. In this example 3 PTT mobiles would participate in the call, for example wireless mobile devices 104, 106 and 108, in addition to the originator wireless mobile device 102 as shown in FIG. 1. The first entry "123" identifies wireless mobile device 104 (PTT #:123) and only the member ID is required as the device is on the same fleet and urban areas as wireless mobile device 102. The second entry "34*45*45" identifies a wireless mobile device (PTT #:34*45*45) which is not within the same fleet and urban area as wireless mobile device 102. Finally the third entry "456" again identifies a wireless mobile device (PTT #:456) in the same fleet and urban area as wireless mobile device 102. Alternatively contact names may be used for PTT number entry, such as "Sally#Harry#Jen" or a combination of PTT numbers and contact names "123#Harry#456". The application verifies the contact from the address book resident on the device and retrieves the appropriate PTT number. This method of SDG call initiation enables users to quickly enter mobile numbers and/or contact names to initiate ad-hoc SDC calls and does not require creation of a dedicated SDG list within the wireless mobile device PTT application or address book.

The unique PTT call identifier "#" (number sign) signifies to the mobile wireless device application that it is a PTT call and that an additional device number follows. In existing PSTN dialing plan an "#" is not required for dialing of telephone numbers. There for "#" can be used to uniquely identify PTT dialing within the mobile device. Alternatively in mobile devices with alphanumeric keyboards any unique non-numerical or alphabetic symbol may be used to delineate PTT mobile ID numbers. The sequence is terminated by the user pressing the push-to-talk button 234, call send key or by a menu selection.

Figure 3:
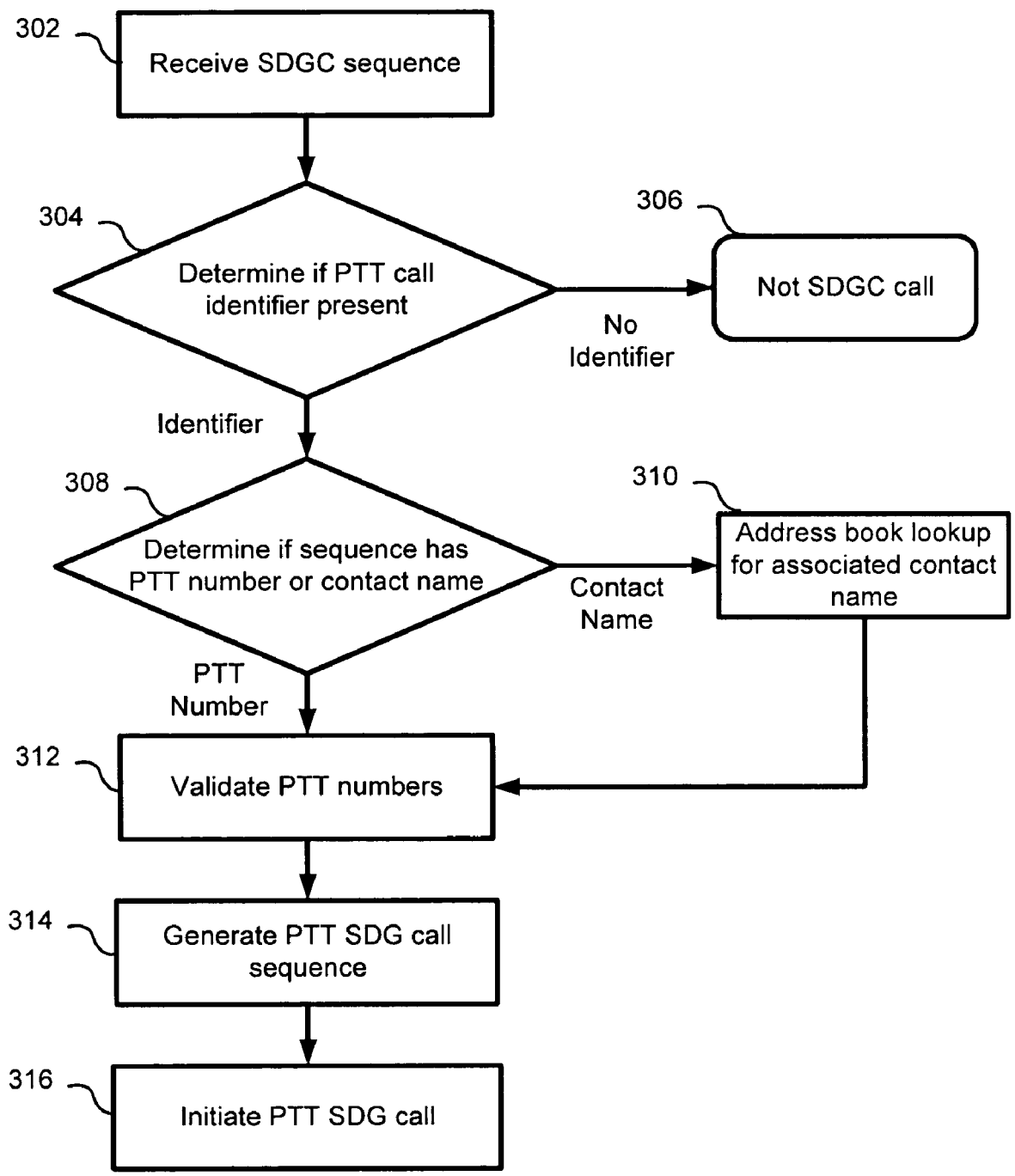
FIG. 3 shows a method of initiating a selective dynamic group call in an application on a mobile wireless device using a sequence of concatenated PTT numbers.

Referring to FIG. 3, a method of initiating a selective dynamic group call in an application on a mobile wireless device using a sequence of concatenated PTT numbers is shown. The method provides a way of initiating the SDG call without using a predefined SDG group and assumes that the entered PTT mobile ID numbers are processed by the wireless mobile device as a received sequence 302. The sequence may be passed to a PTT application for initiating the call from other programs running on the mobile device, such as email or notepad programs 246. The SDG call sequence may provide a hyperlink to a call application when it is selected within the email message or notepad program. The SDG call sequence may be directly entered into a communications program, for example cutting and pasting the number for other applications.

Existing mobile devices require an SDG call to be initiated by predefined SDG group stored within the mobile wireless device such as from within an address book. Users cannot currently configure an on-the-fly SDG call as easily as they would dialing a regular mobile number. PTT number entry is limited to selections from an address book or by entering a group number associated with a particular PTT group. If there are PTT identifiers present in the sequence, such as the '#', at 304, then the individual PTT numbers are identified. If there are no PTT identifiers present in the sequence then the sequence pertains to a private call and is not processed as an SDG PTT call. Optionally at 306, the sequence may contain alphanumeric entries and a contact name may have been provided. For example the sequence may be "Sally#Harry#Jen" or combination "123#Harry#456". If a contact name is provided at 308, then an address book look up is performed at 310 to determine the appropriate PTT entry. If there are similar contact names, the application may prompt the user to select the appropriate contact. In that case, before the call is started, the user will be notified that not all the contact names or numbers have a valid PTT number and the call will proceed with the other valid numbers at 312. Validation may be based upon the format of the entered number or based upon calling restrictions associated with the wireless mobile device. For example, only wireless mobile devices within the same area or fleet may be called. Alternatively, the restriction may be based upon ensuring that the entered numbers are present in the address book prior to initiating the call. The PTT SDG call sequence is then generated at 314 and the call is initiated at 316 by the wireless mobile device transmitting the PTT numbers to the wireless network. The user can then commence conversation with the other group members.

Figure 4:
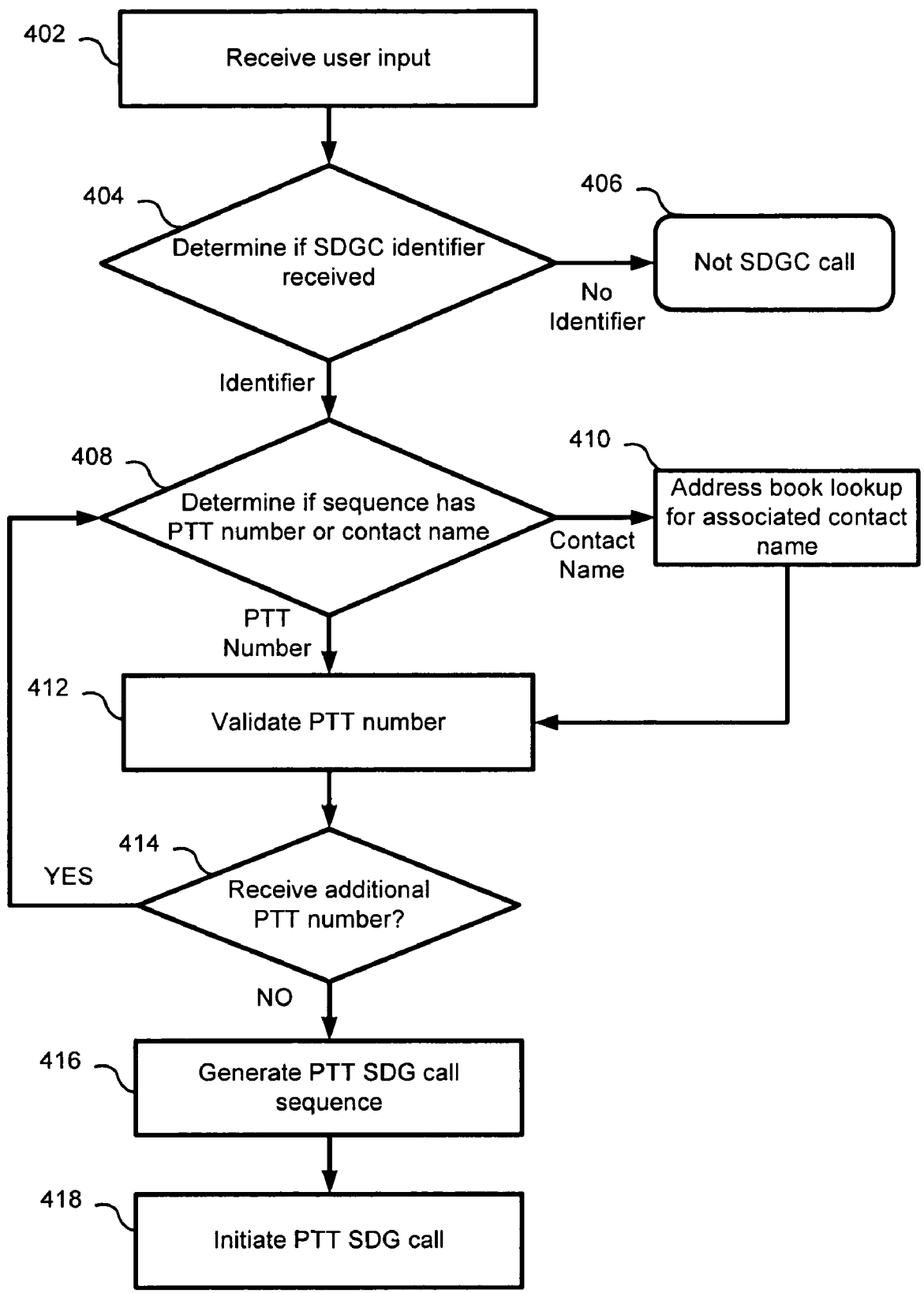
FIG. 4 shows a method of initiating a selective dynamic group call in an application on a mobile wireless device by concatenating multiple PTT numbers.

FIG. 4 shows a method of initiating a selective dynamic group call in an application on a mobile wireless device by concatenating multiple PTT numbers. The input sequence is processed as it is entered by a user at 402. During entry it is determined if an SDGC identifier, such as '#', is present in the sequence at 404. If there are no identifiers present a private call is initiated at 406. Optionally, at the reception of the first identifier it is determined if a numeric PTT call identifier has been provided or a contact name at 408. For example if the user first enters "Sally", the application either selects the appropriate PTT contact or the user is provided the option to pick the most appropriate number from the address book at 410. The numbers are then validated at 412. Validation may be based upon the format of the entered number or based upon calling restrictions associated with the wireless mobile device. For example, only wireless mobile devices within the same area or fleet may be called. Alternatively, the restriction may be based upon ensuring that the entered numbers are present in the address book prior to initiating the call. If an additional PTT number contact number is received, YES at step 414, the input can be checked for alpha input at step 408 or directly validated at 412. If no additional input is received, NO at step 414, the call is initiated by the user by pushing the push-to-talk button 234 or call initiation button, the PTT SDG call sequence is then generated at 416 and the call is initiated. At 418 the wireless mobile device transmits the PTT numbers to the wireless network. The user can then commence conversation with the other group members.

While a particular embodiment of the present method for initiating a selective dynamic group call from a wireless mobile application has been described herein, it will be appreciated by those skilled in the art that changes and modifications may be made thereto without departing from the disclosure in its broadest aspects and as set forth in the following claims.

The invention claimed is:

1. A method of initiating a selective dynamic group (SDG) call from an application on a push-to-talk (PTT) capable wireless mobile device on a wireless network, the method comprising:
  receiving a concatenated input sequence entered to the application on the wireless mobile device;
  determining if one or more PTT call identifiers are present in the concatenated input sequence, each of the one or more PTT call identifiers separating unique PTT mobile numbers;
  validating a plurality of PTT mobile numbers separated by the one or more PTT call identifiers;
  generating a PTT SDG call sequence using the plurality of validated PTT mobile numbers; and
  initiating the PTT SDG call on the wireless network to the PTT mobile numbers identified by the concatenated input sequence.

2. The method of claim 1 wherein the PTT call identifier is one of a number sign "#" and an alphanumeric symbol.

3. The method of claim 1 wherein the concatenated input sequence is received by detecting concatenated PTT mobile numbers separated by one or more PTT call identifiers in message paragraphs in an email message, the concatenated input sequence providing a hyperlink to initiating the PTT call.

4. The method of claim 3 wherein validating PTT mobile numbers occurs when a call initiator input is received from the user.

5. The method of claim 4 wherein the call initiator is performed by one of pressing a push-to-talk button of the mobile wireless device, pressing a send key and a menu selection.

6. The method of claim 1 wherein generating the SDG call sequence occurs when a call initiator input is received.

7. The method of claim 6 wherein the call initiator is performed by one of pressing a push-to-talk button of the mobile wireless device, pressing a call talk button and a menu selection.

8. The method of claim 1 wherein the PTT mobile number identified in the concatenated input sequence contains one or more alphanumeric entries identifying contact names, the method further comprising performing a look up in an address book stored in memory of the wireless device to determine the appropriate PTT entry for the contact name and the PTT mobile number.

9. The method of claim 8 further comprising providing a prompt to the user to select the appropriate contact name from a plurality of address contacts.

10. The method of claim 9 further comprising notifying the user that a contact name does not have a valid PTT mobile number associated with it.

11. The method of claim 1 wherein the wireless network is an iDEN network.

12. The method of claim 11 wherein the PTT mobile numbers are formatted as one of Urban Identifier * Fleet Identifier * Member Identifier, or only Member Identifier when the identified PTT mobile number is in the same Urban Identifier and Fleet Identifier as the wireless mobile device.

13. The method of claim 1 wherein the wireless network is a Push-to-Talk over cellular based network as defined by the Open Mobile Alliance.

14. A wireless mobile device capable of initiating push-to-talk (PTT) selective dynamic group (SDG) calls on a push-to-talk capable wireless network, the wireless mobile device comprising:
    a transmitter for initiating SDG calls;
    a receiver for receiving SDG calls;
    a control processor for executing SDG calls using the transmitter and receiver by executing an application for performing:
        receiving an concatenated input sequence entered to the application on the wireless mobile device;
        determining if one or more PTT call identifiers are present in the concatenated input sequence, each of the one or more PTT call identifiers separating unique PTT mobile numbers;
        validating a plurality of PTT mobile numbers separated by the one or more PTT call identifiers;
        generating a PTT SDG call sequence using the plurality of validated PTT mobile numbers; and
        initiating the PTT SDG call on the wireless network to the PTT mobile numbers identified in the input sequence.

15. The device of claim 14 wherein the PTT call identifier is one of a number sign "#" and an alphanumeric symbol.

16. The device of claim 14 wherein the PTT mobile number identified in the concatenated input sequence contains one or more alphanumeric entries identifying contact names, the method further comprising performing a look up in an address book stored in memory of the wireless device to determine the appropriate PTT entry for the contact name and the PTT mobile number.

17. The device of claim 16 further comprising providing a prompt to the user to select the appropriate contact name from a plurality of address contacts.

18. The device of claim 17 further comprising notifying the user that a contact name does not have a valid PTT mobile number associated with it.

* * * * *